United States Patent
Stumpf

[11] 3,931,491
[45] Jan. 6, 1976

[54] APPARATUS FOR CUTTING A STACK OF SHEET MATERIAL WITH A THERMAL CUTTING BEAM WHILE PREVENTING FUSING TOGETHER OF ADJACENT SHEETS

[76] Inventor: Günter Stumpf, 7421 Mehrstetten (Kreis Munsingen), Germany

[22] Filed: May 20, 1974

[21] Appl. No.: 471,772

[30] Foreign Application Priority Data
May 22, 1973 Germany............................ 2326049

[52] U.S. Cl............................................ 219/121 L
[51] Int. Cl.² ............................................ B23K 15/00
[58] Field of Search .... 219/121 L, 121 LM; 121 EB, 219/121 EM, 137, 85 R; 29/491, 488

[56] References Cited
UNITED STATES PATENTS

| | | | |
|---|---|---|---|
| 3,629,546 | 12/1971 | Fry | 219/121 L |
| 3,649,806 | 3/1972 | Konig | 219/121 EM |
| 3,735,088 | 5/1973 | Idall | 219/137 X |

*Primary Examiner*—J. V. Truhe
*Assistant Examiner*—G. R. Peterson
*Attorney, Agent, or Firm*—Haseltine, Lake & Waters

[57] ABSTRACT

Apparatus for cutting a stack of layers of sheet material comprising a device for passing a laser beam or other suitable thermal cutting beam through the stack of material along a line of cut therein and means for preventing fusing of adjacent sheets at the line of cut. Such means can include spacers carried by the cutting head and interposed between adjacent sheets to maintain the sheets in spaced relation, or a spray device for spraying a cooling liquid onto the sheets at the line of cut or the presence of paper of similar combustible material, which does not liquefy, between adjacent sheets.

9 Claims, 6 Drawing Figures

3,931,491

APPARATUS FOR CUTTING A STACK OF SHEET MATERIAL WITH A THERMAL CUTTING BEAM WHILE PREVENTING FUSING TOGETHER OF ADJACENT SHEETS

FIELD OF INVENTION

This invention relates to apparatus for cutting a stack of layers of sheet material.

PRIOR ART

It is known to employ a laser beam for cutting material. The laser beam melts the material at a line of cut. If it is required to cut a plurality of layers of sheet material, such as foil or fabric, disposed one above another, in particular in the case of a stack of textile materials, a problem arises due to the melting and the layers of foil or fabric fuse together along the line of cut because in the vicinity of the line they pass through a liquid phase. Separation of the parts which have been cut is frequently possible only with difficulty. In the case of textile fabrics, fusing particularly occurs when the textile fabrics contain synthetic fibres.

SUMMARY OF THE INVENTION

An object of the invention is to provide and apparatus for cutting layers of sheet material by means of a laser beam which avoids the fusing difficulty associated with the prior art.

According to one aspect of the present invention there is provided a device for cutting a stack of layers of sheet material comprising projecting means for projecting a thermal cutting beam towards said layers of sheet material and movable relative to said layers of sheet material thereby to cut said layers of sheet material along a line of cut, and spacing means for spacing said layers of sheet material apart in the vicinity of said thermal cutting beam so as substantially to prevent the thermal cutting process from causing the fusing together of adjacent layers of sheet material.

According to another aspect of the present invention there is provided a device for cutting a stack of layers of sheet material, the device comprising projecting means for projecting a thermal cutting beam towards said layers of sheet material and movable relative to said layers of sheet material, and fluid-supply means operable to supply coolant fluid to said layers of sheet material in the vicinity of said beam so as substantially to prevent the thermal cutting process from causing the fusing together of adjacent layers of sheet material.

According to a further aspect of the present invention there is provided apparatus for cutting a stack of layers of sheet material, wherein a thermal cutting beam is moved relative to said layers of sheet material, there being disposed between adjacent ones of said layers of sheet material laminate separating material which substantially prevents said layers of sheet material from being fused together by said beam in the vicinity of the line of cut thereof.

BRIEF DESCRIPTION OF THE DRAWING

In order that the invention may be clearly understood and readily carried into effect, reference will now be made, by way of example, to the accompanying drawings, in which.

DETAILED DESCRIPTION

Figure 1:
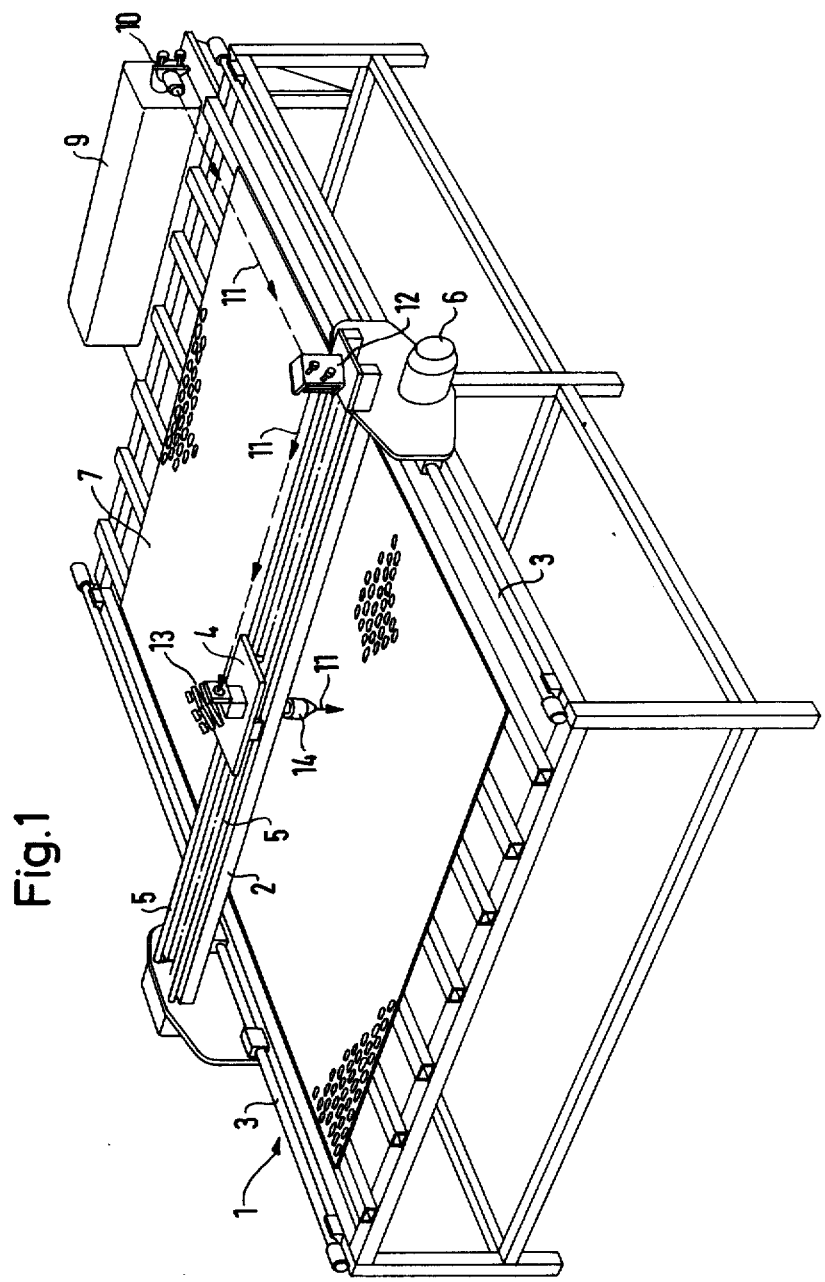
FIG. 1 is a perspective view of a cutting device for cutting layers of foil or fabric by means of a laser beam.
Figure 3:
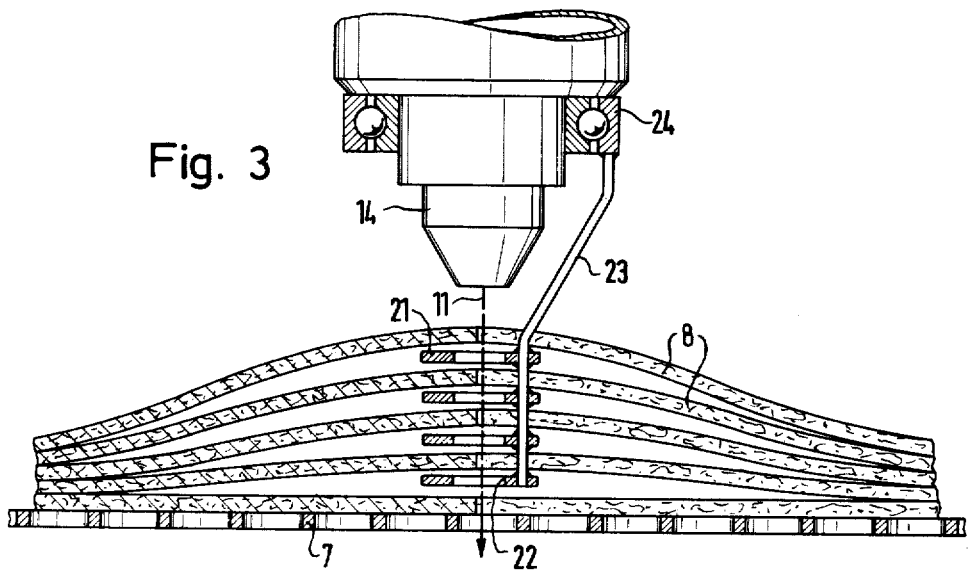
FIG. 3 is a sectional elevation view of the focussing head and the spacer shown in FIG. 2 in an operative condition.

Referring to FIG. 1 therein is seen a cutting device which comprises a table 1, on which a first carriage 2 is arranged to be displaceable on rails 3. A second carriage 4 is mounted for displacement on rails 5 on the first carriage 2. The first carriage 2 is driven by a motor 6. The second carriage 4 is driven by a further drive means (not shown). The table 1 has a perforated table top 7 serving as a support means on which layers of foil or fabric 8 to be cut are placed (see FIGS. 3 and 5).

Figure 2:
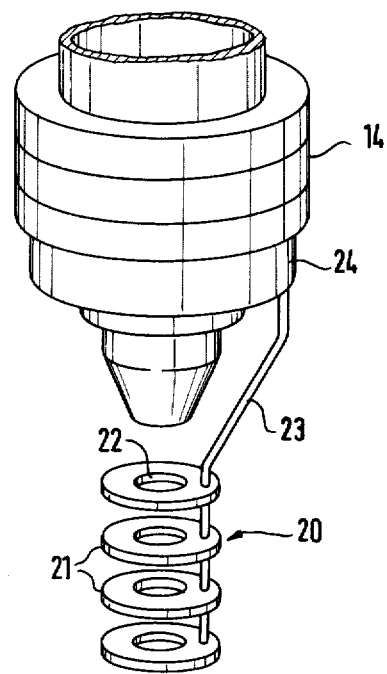
FIG. 2 is a perspective view of a focussing head of the device, and a spacer secured to the focussing head.

A laser gun 9 is secured to the table 1 so as to be stationary relative to the table. The laser gun 9 generates laser light which is radiated, by means of an optical system 10, as a laser beam 11, providing a thermal cutting beam, to a first mirror assembly 12 mounted on the first carriage 2. The first mirror assembly 12 reflects the laser beam to a second mirror assembly 13 mounted on the second carriage 4. The second mirror assembly 13 reflects the laser beam 11 into a focussing head 14 by means of which the laser beam 11 is focussed onto the layers 8 of foil or fabric to be cut. To prevent the layers 8 from fusing together in the cutting zone, a spacer 20 (see FIGS. 2 and 3) is provided. The spacer 20 comprises a plurality of discs 21 each formed with a central hole 22. The peripheral edges of the discs 21 are rounded off as viewed in transverse section. The discs 21 are mounted concentrically with respect to the laser beam 11 on a rod 23 attached to one of the races of a ball bearing 24. The other race of the ball bearing 24 is secured to the focussing head 14. Since the connection between the rod 23 and the disc 21 is eccentric with reference to the laser beam 11, the spacer 20 will always follow the curvatures of the cut in such manner that the laser beam is able to pass through the apertures 22 in the discs 21. Alignment is effected in that the rod 23 is guided by the cut edges of the layers 8. As will be realized there could alternatively be provided a separate drive for the spacer 20.

Figure 4:
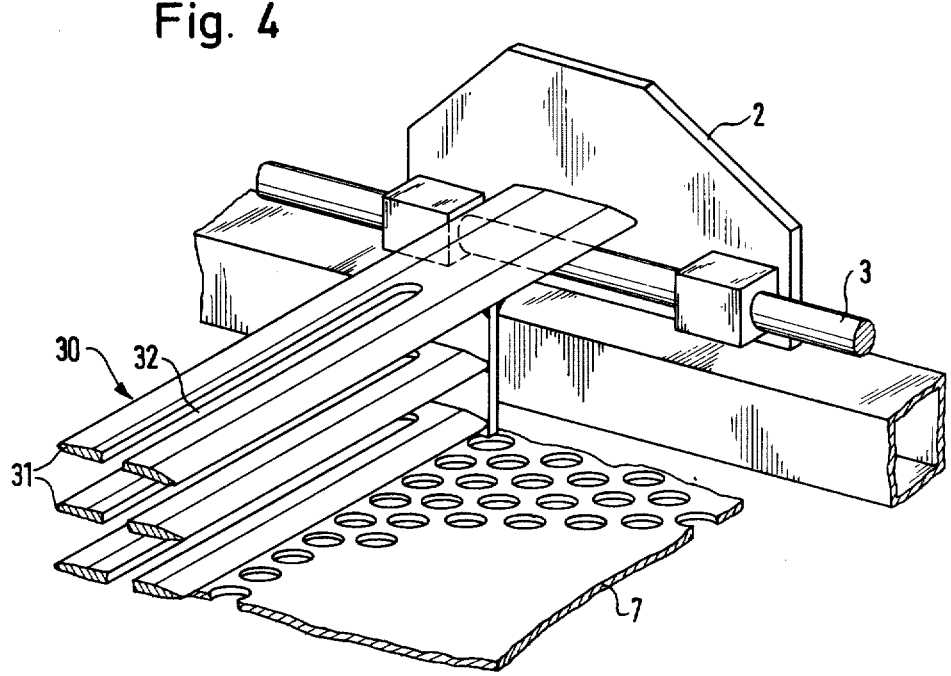
FIG. 4 is a perspective view of a portion of the device shown in FIG. 1 including a second embodiment of spacer.
Figure 5:
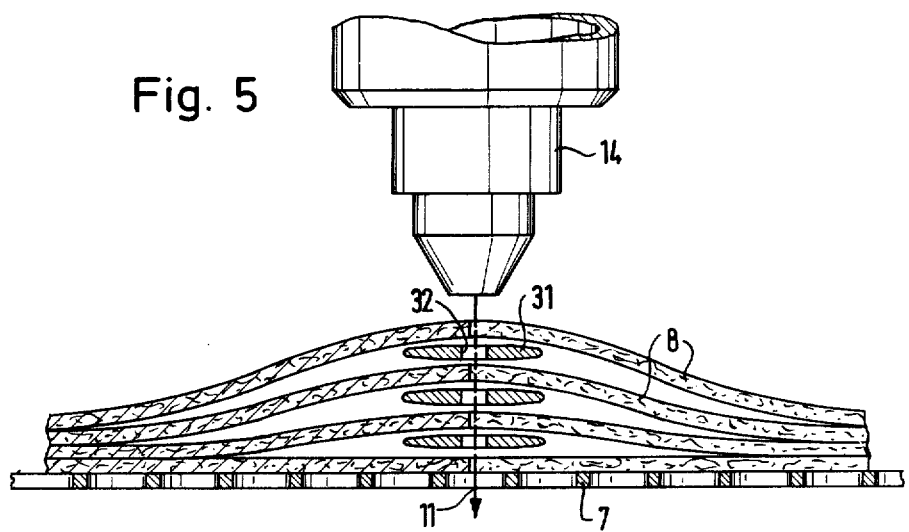
FIG. 5 is a sectional elevation view of the focussing head of the device and the spacer of FIG. 4 in an operative condition.

A different type of spacer is shown in FIGS. 4 and 5 and designated by numeral 30. In this case, the spacer 30 comprises flat strips 31 disposed one above the other each being formed with a longitudinal slot 32. The strips 31 are secured to the first carriage 2 for movement therewith. They are so aligned that the path of the laser beam 11 extends through the slots 32. The outer, longitudinal edges of the strips 31 are rounded off and are of streamlined section. They may be replaced with pairs of wires.

Figure 6:
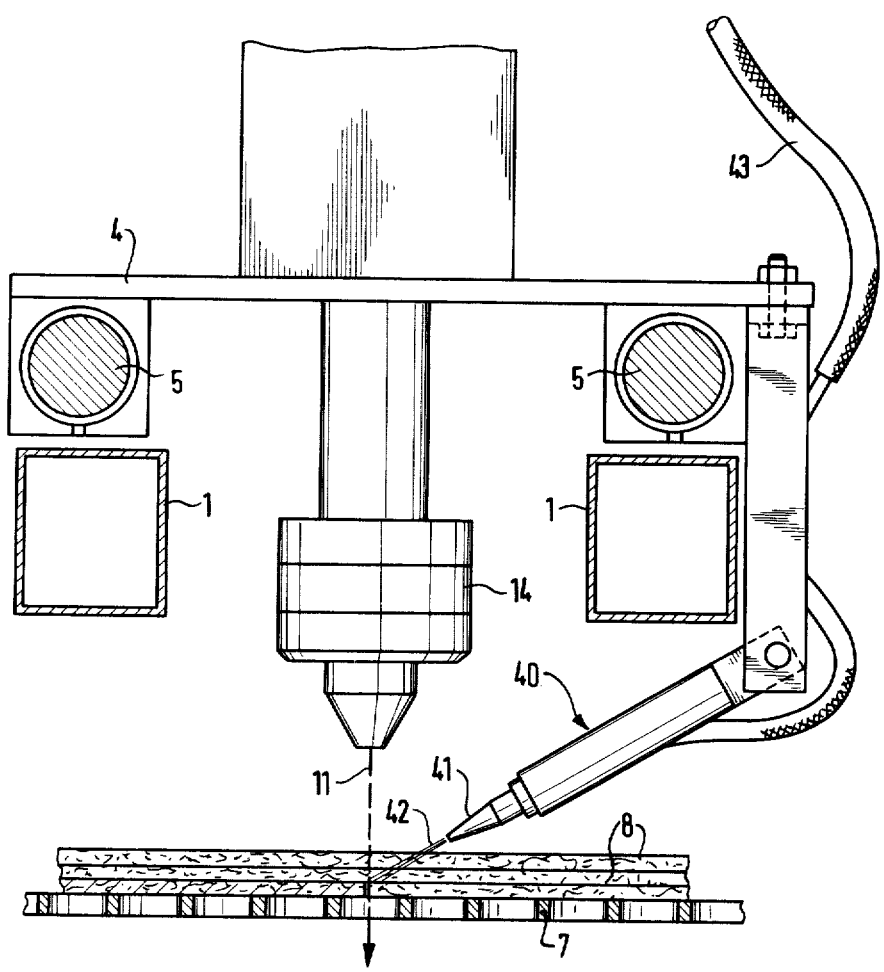
FIG. 6 is an elevation view partly in section of a portion of the cutting device shown in FIG. 1 including a spraying device.

A further means for preventing the fusing together of the layers 8, or at least for reducing such fusing, is shown in FIG. 6. In this arrangement, there is secured to the second carriage 4 a spraying device 40 having a nozzle head 41. The spraying device 40 is supplied, via a hose 43, with a coolant liquid which is sprayed by the nozzle head 41 in the form of a liquid jet 42, onto the cut location. The liquid may, for example, be water provided with an agent reducing its surface tension and therefore increasing the speed and degree of penetration of the water. The water withdraws vaporization heat in the vicinity of the line of cut, thereby preventing fusing together of the layers not only in the immediate cutting zone but also in the adjacent zones.

Fusion between the layers 8 may also be prevented by disposing among the layers laminate separating material which under the heating action of the laser beam 11 burns but does not pass through a liquid phase. For example, the separating material may be paper.

What is claimed is:

1. A device for cutting a stack of layers of sheet material comprising projecting means for projecting a thermal cutting beam towards said layers of sheet material and movable relative to said layers of sheet material thereby to cut said layers of sheet material along a line of cut, and spacing means for spacing said layers of sheet material apart in the vicinity of said thermal cutting beam so as substantially to prevent fusing together of adjacent layers of sheet material, said spacing means comprising spaced members interspersable with said layers of sheet material, said spaced members having respective pre-formed apertures extending therethrough which are aligned with one another so as to permit passage of said beam therethrough and supporting means securing said spaced members relative to said projecting means at least in one direction of movement of said projecting means, said apertures being positioned relative to said supporting means such that said beam is aligned with said apertures.

2. A device as claimed in claim 1, wherein said projecting means comprises a beam focussing means, said spaced members being connected to said beam focussing means.

3. A device as claimed in claim 2, in which said apertures are holes, said spaced members being pivotably supported about an axis passing through said holes.

4. A device as claimed in claim 3, comprising a roller bearing including a first race secured to said projecting means and a second race to which said spaced members are secured.

5. A device as claimed in claim 3, in which said spaced members have peripheral edges which are rounded-off in section planes containing said axis.

6. A device as claimed in claim 1 comprising means supporting the beam projecting means for movement in two coordinate directions, said spaced members comprising a plurality of pairs of elongate members spaced apart for interspersion with said layers of sheet material, each pair of elongate members bounding an elongate slit therebetween constituting one said aperture, the slits being in registry with one another to permit passage of said beam through the slits, said pairs of elongate members being fixed by said supporting means relative to said beam along one of said two coordinates of movement of said beam, the slits extending in the direction of the other of said two coordinates.

7. A device as claimed in claim 6, further comprising support means for supporting said layers of sheet material, first carriage means movable relative to said support means in the direction of said one of the co-ordinates, second carriage means mounted on said first carriage means and movable therealong in the direction of said other of the co-ordinates, said projecting means including beam focussing means mounted on said second carriage means, said pairs of elongate members being secured by said supporting means to said first carriage means for movement therewith.

8. A device as claimed in claim 6, in which said elongate members are in the form of strips having leading and trailing edges which are rounded-off.

9. A device as claimed in claim 8, in which said strips are of streamlined section.

* * * * *